United States Patent
Sweeney

(10) Patent No.: US 9,292,855 B2
(45) Date of Patent: *Mar. 22, 2016

(54) SYNTHESIZING MESSAGING USING CONTEXT PROVIDED BY CONSUMERS

(75) Inventor: Peter Sweeney, Kitchener (CA)

(73) Assignee: Primal Fusion Inc., Kitchener (CA)

( * ) Notice: Subject to any disclaimer, the term of this patent is extended or adjusted under 35 U.S.C. 154(b) by 1268 days.

This patent is subject to a terminal disclaimer.

(21) Appl. No.: 12/555,293

(22) Filed: Sep. 8, 2009

(65) Prior Publication Data

US 2011/0060794 A1    Mar. 10, 2011

(51) Int. Cl.
*G06F 15/16* (2006.01)
*G06Q 30/02* (2012.01)
*G06F 17/30* (2006.01)

(52) U.S. Cl.
CPC .......... *G06Q 30/02* (2013.01); *G06F 17/30914* (2013.01); *G06F 17/3089* (2013.01)

(58) Field of Classification Search
CPC ...................... G06F 17/30914; G06F 17/308
USPC ............................................. 709/204; 20/204
See application file for complete search history.

(56) References Cited

U.S. PATENT DOCUMENTS

| | | | |
|---|---|---|---|
| 3,943,462 A | 3/1976 | Thompson | |
| 4,532,813 A | 8/1985 | Rinehart | |
| 4,972,328 A | 11/1990 | Wu et al. | |
| 5,056,021 A | 10/1991 | Ausborn | |
| 5,193,185 A | 3/1993 | Lanter | |
| 5,369,763 A | 11/1994 | Biles | |
| 5,617,514 A | 4/1997 | Dolby et al. | |
| 5,745,910 A | 4/1998 | Piersol et al. | |
| 5,793,376 A | 8/1998 | Tanaka et al. | |

(Continued)

FOREIGN PATENT DOCUMENTS

| | | |
|---|---|---|
| CA | 2734756 A1 | 3/2010 |
| CN | 1395193 A | 2/2003 |

(Continued)

OTHER PUBLICATIONS

International Search Report and Written Opinion for International Application No. PCT/CA2010/001382 mailed Jan. 13, 2011.

(Continued)

*Primary Examiner* — Hua Fan
(74) *Attorney, Agent, or Firm* — Wolf, Greenfield & Sacks, P.C.

(57) ABSTRACT

The present invention provides a computer network implementable integration of promoted information with non-promoted content before a consumer interaction with the network, such that when the consumer interacts with the network, a consumer information interacts with this integrated content and delivers a message to the consumer such that the consumer visualizes this message as part of consumer experience without distracting from the network interaction task at hand. The integration is facilitated by semantic analysis and synthesis to naturally position the promoted content as close to the consumer interaction tasks as possible at that instant. This approach displaces the current practice of matching message to media placement while further enabling a promoter to evaluate and respond to feedback data depicting the efficacy of the sponsor message. The network in question is any computer network such as the Internet or intranet.

35 Claims, 8 Drawing Sheets

(56) References Cited

U.S. PATENT DOCUMENTS

| | | |
|---|---|---|
| 5,835,758 A | 11/1998 | Nochur et al. |
| 5,911,145 A | 6/1999 | Arora et al. |
| 5,937,400 A | 8/1999 | Au |
| 5,953,726 A | 9/1999 | Carter et al. |
| 6,006,222 A | 12/1999 | Culliss |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 | 9/2001 | Belles et al. |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,675,159 B1 | 1/2004 | Lin et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,816,857 B1 | 11/2004 | Weissman et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,440,940 B2 | 10/2008 | Chen et al. |
| 7,478,089 B2 | 1/2009 | Henkin et al. |
| 7,490,073 B1 | 2/2009 | Qureshi et al. |
| 7,493,319 B1 | 2/2009 | Dash et al. |
| 7,496,593 B2 | 2/2009 | Gardner et al. |
| 7,502,810 B2 | 3/2009 | Acevedo-Aviles et al. |
| 7,580,918 B2 | 8/2009 | Chang et al. |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,698,266 B1 | 4/2010 | Weissman et al. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,945,555 B2 | 5/2011 | Sankaran et al. |
| 7,970,764 B1 | 6/2011 | Ershov |
| 8,010,570 B2 | 8/2011 | Sweeney |
| 8,281,238 B2 | 10/2012 | Sweeney et al. |
| 8,296,179 B1 | 10/2012 | Rennison |
| 2002/0069197 A1 | 6/2002 | Katayama et al. |
| 2002/0078044 A1 | 6/2002 | Song et al. |
| 2002/0091736 A1 | 7/2002 | Wall |
| 2002/0133483 A1 | 9/2002 | Klenk et al. |
| 2002/0194187 A1 | 12/2002 | McNeil et al. |
| 2003/0177112 A1* | 9/2003 | Gardner ............................ 707/3 |
| 2003/0196094 A1 | 10/2003 | Hillis et al. |
| 2003/0217023 A1 | 11/2003 | Cui et al. |
| 2003/0217335 A1 | 11/2003 | Chung et al. |
| 2004/0001087 A1 | 1/2004 | Warmus et al. |
| 2004/0024739 A1 | 2/2004 | Copperman et al. |
| 2004/0049522 A1 | 3/2004 | Streepy, Jr. |
| 2004/0117395 A1 | 6/2004 | Gong et al. |
| 2005/0010428 A1 | 1/2005 | Bergeron et al. |
| 2005/0060297 A1 | 3/2005 | Najork |
| 2005/0065955 A1 | 3/2005 | Babikov et al. |
| 2005/0086188 A1 | 4/2005 | Hillis et al. |
| 2005/0149502 A1 | 7/2005 | McSherry |
| 2005/0149518 A1 | 7/2005 | Duan et al. |
| 2005/0154708 A1 | 7/2005 | Sun |
| 2005/0209874 A1 | 9/2005 | Rossini |
| 2005/0216335 A1 | 9/2005 | Fikes et al. |
| 2005/0223109 A1 | 10/2005 | Mamou et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1* | 6/2006 | Wall ............................ 715/500 |
| 2006/0153083 A1 | 7/2006 | Wallenius |
| 2006/0156222 A1 | 7/2006 | Chi et al. |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |
| 2007/0112840 A1 | 5/2007 | Carson et al. |
| 2007/0118542 A1 | 5/2007 | Sweeney |
| 2007/0136221 A1* | 6/2007 | Sweeney et al. ................ 706/20 |
| 2007/0143300 A1 | 6/2007 | Gulli et al. |
| 2007/0174041 A1 | 7/2007 | Yeske |
| 2007/0174255 A1 | 7/2007 | Sravanapudi et al. |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004864 A1 | 1/2008 | Gabrilovich et al. |
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0120072 A1 | 5/2008 | Bartz et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0189307 A1 | 8/2008 | Sankaran et al. |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |

(56) References Cited

U.S. PATENT DOCUMENTS

| | | |
|---|---|---|
| 2008/0281814 A1 | 11/2008 | Calistri-Yeh et al. |
| 2008/0294584 A1 | 11/2008 | Herz |
| 2009/0012842 A1 | 1/2009 | Srinivasan et al. |
| 2009/0016600 A1 | 1/2009 | Eaton et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0083208 A1 | 3/2009 | Raghavan et al. |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0215479 A1 | 8/2009 | Karmarkar |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1* | 12/2009 | Chakra et al. ............. 709/204 |
| 2010/0004975 A1 | 1/2010 | White et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0281029 A1 | 11/2010 | Parikh et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0106821 A1 | 5/2011 | Hassanzadeh et al. |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0295903 A1 | 12/2011 | Chen |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2012/0233127 A1 | 9/2012 | Solmer et al. |
| 2012/0330936 A1 | 12/2012 | McCloskey et al. |
| 2013/0035996 A1 | 2/2013 | Frey |

FOREIGN PATENT DOCUMENTS

| | | |
|---|---|---|
| CN | 101268483 A | 9/2008 |
| CN | 101385025 A | 3/2009 |
| EP | 0 962 873 A1 | 12/1999 |
| JP | 2002-366836 A | 12/2002 |
| JP | 2004-145661 A | 5/2004 |
| JP | 2007-241713 A | 9/2007 |
| JP | 2009-508275 A | 2/2009 |
| JP | 2009-521750 | 6/2009 |
| WO | WO 02/054292 A2 | 7/2002 |
| WO | WO 2004/061546 A2 | 7/2004 |
| WO | WO 2004/061546 A3 | 7/2004 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/063987 A2 | 5/2008 |
| WO | WO 2008/076438 A1 | 6/2008 |
| WO | WO 2009/014837 A2 | 1/2009 |
| WO | WO2009014837 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Chinese Office Action for Chinese Application No. 200780032062.9, Issued May 17, 2011.
International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 mailed Aug. 24, 2009.
International Preliminary Report on Patentability for PCT/CA2009/000567 mailed Nov. 11, 2010.
International Search Report and Written Opinion for PCT/CA2009/001185 mailed Dec. 3, 2009.
International Preliminary Report on Patentability for PCT/CA2009/001185 mailed Mar. 10, 2011.
International Search Report and Written Opinion for PCT/CA2010/001382 mailed Jan. 13, 2011.
International Preliminary Report on Patentability for PCT/CA2010/001382 mailed Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 mailed Oct. 13, 2011.
International Search Report and Written Opinion for PCT/CA2011/000719 mailed Sep. 28, 2011.
International Search Report and Written Opinion for PCT/CA2011/000745 mailed Sep. 22, 2011.
International Search Report and Written Opinion for PCT/CA2011/001382 mailed Apr. 24, 2012.
International Search Report and Written Opinion for PCT/CA2011/001402, mailed Apr. 24, 2012.
International Search Report and Written Opinion for PCT/CA2011/001403 mailed May 23, 2012.

(56) References Cited

OTHER PUBLICATIONS

International Search Report and Written Opinion for PCT/CA2012/000007 mailed Apr. 20, 2012.
International Search Report and Written Opinion for PCT/CA2012/000009 mailed May 1, 2012.
Office Action for U.S. Appl. No. 11/625,452 mailed Mar. 30, 2009.
Office Action for U.S. Appl. No. 11/625,452 mailed Dec. 7, 2009.
Office Action for U.S. Appl. No. 11/625,452 mailed Mar. 26, 2010.
Office Action for U.S. Appl. No. 12/477,994 mailed Aug. 31, 2010.
Office Action for U.S. Appl. No. 12/477,977 mailed Sep. 28, 2010.
Office Action for U.S. Appl. No. 11/469,258 mailed Aug. 21, 2008.
Interview Summary for U.S. Appl. No. 11/469,258 mailed Dec. 16, 2008.
Office Action for U.S. Appl. No. 11/550,457 mailed Dec. 15, 2008.
Office Action for U.S. Appl. No. 12/556,349 mailed Jun. 29, 2010.
Office Action for U.S. Appl. No. 12/441,100 mailed Jun. 9, 2011.
Office Action for U.S. Appl. No. 12/441,100 mailed Jan. 24, 2012.
Advisory Action for U.S. Appl. No. 12/441,100 mailed May 4, 2012.
Office Action for U.S. Appl. No. 12/549,812 mailed Oct. 1, 2012.
Office Action for U.S. Appl. No. 12/555,222 nailed Jan. 27, 2012.
Office Action for U.S. Appl. No. 12/555,222 mailed Oct. 31, 2012.
Office Action for U.S. Appl. No. 12/555,341 mailed Feb. 9, 2012.
Office Action for U.S. Appl. No. 12/555,341 mailed Aug. 1, 2012.
Office Action for U.S. Appl. No. 12/615,703 mailed Feb. 1, 2012.
Office Action for U.S. Appl. No. 13/105,890 mailed Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilisitc justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998;1398:4-15.
Ma et al., Semantic Information Extraction of Video Based on Ontology and Inference. ICSC 2007. International Conference on Semantic Computing. 2007;1:721-726. Digital Object Identifier: 10.1109/ICSC.2007.12.
Metzler et al., A markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artifical Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.
Terra et al., Frequency estimates for statistical word similarity measures. Proceedings of 2003 Conference of the North American Chapter of the Association for Computational Linguistics on Human Language Technology. 2003:165-172.
Wang et al., Gene expression correlation and gene ontology-based similarity: An assesment of quantitative relationships. Proceedings of IEEE Symposium on Computational Intelligence in Bioinformatics and Computational Biology. 2004:25-31.
Wu et al., Interpreting tf-idf term weights as making relevance decisions. ACM Transactions on Information Systems. 2008;26(3):Article No. 13.
Zhai, Statistical language models for information retrieval—a critical review. Foundations and Trends in Information Retrieval. 2008;2(3):137-213.
Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.
Office Action from U.S. Appl. No. 12/555,341 dated Feb. 9, 2012.
Office Action from U.S. Appl. No. 12/555,222 dated Jan. 27, 2012.
Japanese Office Action for Japanese Application No. 2012-528200 mailed Jul. 16, 2013.
International Preliminary Report on Patentability for PCT/CA2012/000007, mailed Jul. 11, 2013.
Office Action for U.S. Appl. No. 12/555,222 mailed Mar. 26, 2013.
Advisory Action for U.S. Appl. No. 12/555,222 mailed Jul. 9, 2013.
Chinese Office Action for Chinese Application No. 201080047908.8 mailed Sep. 17, 2014.
Japanese Office Action for Japanese Application No. 2012-528200 mailed Apr. 22, 2014.
Japanese Office Action for Japanese Application No. 2012-528200 mailed Nov. 4, 2014.
Office Action for U.S. Appl. No. 12/555,222dated Apr. 15, 2014.

(56) References Cited

OTHER PUBLICATIONS

Applicant-Initiated Interview Summary for U.S. Appl. No. 12/555,222 dated Aug. 19, 2014.
Office Action for U.S. Appl. No. 12/555,222 dated Dec. 5, 2014.
Office Action for U.S. Appl. No. 12/555,341 dated Apr. 15, 2014.
Office Action for U.S. Appl. No. 12/555,341 dated Mar. 3, 2015.
Office Action for U.S. Appl. No. 13/340,792 dated Jun. 10, 2014.
Office Action for U.S. Appl. No. 13/340,792 dated Dec. 22, 2014.
Canadian Office Action for Canadian Application No. 2,774,075 dated Feb. 24, 2015.
Japanese Office Communication for Application No. 2014-149123 dated Aug. 11, 2015.

* cited by examiner

RELEVANCE MATCHING BETWEEN ADVERTISERS' MESSAGING AND MEDIA PLACEMENTS

OVERVIEW

ANALYSIS

SYNTHESIS

FIGURE 7

SAMPLE SEMANTICALLY
SYNTHESIZED WEB PAGE

Birdwatching—Abyssinian Parrot

Maecenas metus lorem, porttitor quis, adipiscing quis, blandit scelerisque, felis. Maecenas suscipit mollis lectus.

Bird image | Sed id arcu eleifend nunc interdum ornare. Curabitur rhoncus mattis purus. Curabitur vel neque consectetuer justo dignissim auctor. Morbi nunc ipsum, dapibus quis, ultrices vitae, ullamcorper ac, massa.

Where and when to spot them

Etiam et lectus central Ethiopia south to northeastern Tanzania. Duis congue rutrum lacus Awash National Park, 200 km east of Addis Ababa.

Awash National Park image

Quisque sit amet ante. Ut mi quam, sollicitudin non, aliquet a, ornare non, enim. In id sapien.

Travel in Ethiopia

Nunc eros entry/exit requirements justo, tincidunt et, mattis nec, varius et, urna. Sed health information suscipit. Donec a accommodations nisl <ABC Hotel>. Fusce neque lacus, sollicitudin eu, venenatis ac, pellentesque id, lacus <Addis Guest House>. In sit currency exchange amet nisl. Vestibulum travel advisories gravida.

<XYZ Binoculars> image

Equipment

Cum sociis natoque penatibus et magnis dis parturient <binoculars> montes, nascetur ridiculus mus.

SYNTHESIZING MESSAGING USING CONTEXT PROVIDED BY CONSUMERS

FIELD OF THE INVENTION

The present invention relates to synthesized messaging and real-time consumer contextual information. The present invention more specifically relates to synthesizing messaging to automate advertising processes.

BACKGROUND OF THE INVENTION

Online advertising has seen phenomenal growth over the last few years, growing hand-in-hand with the expansion of the Internet. It has evolved from randomly displayed, passive advertisements to advertisements targeted to specific individuals based on their demographic and psychographic profile. Examples of such technologies are given by U.S. Pat. No. 7,062,466, U.S. Pat. No. 7,007,074 and US Patent Applications 20050216335, 20070038500, 20080243480, 20080228568 and 20090070219. What all these approaches to advertising hold in common is establishing the appropriate context for the advertisement. This context is established by matching a specific individual or consumer group with the media or content that provides the context for the advertisement. Broadly, contextualizing is known as relevance matching. It is apparent that online advertising is struggling to resolve the problem of matching the message of the advertisement with the context of media placements such as web pages.

Relevance matching, however, is only one small portion of a much larger advertising process. The typical advertising process is complex and time-intensive. As a result, it excludes many small businesses and individuals who lack the professional expertise. Some of the essential elements of the typical advertising process comprise:

recognizing an audience by identifying prospects of unmet needs and evaluating the environment within which the audience exists;
  evaluating and identifying market segments;
  developing a strategy to target audiences by positioning and developing messaging as well as choosing appropriate media placement and buys;
  developing and managing an advertisement campaign;
  developing and executing sales-related feedback;
  performing analysis on sales-related data; and
  making necessary corrections to the whole process in light of campaign performance.

This cumbersome situation has only become more complex with the advent of online advertising and the evolution to context-generated advertisements. These approaches represent technical improvements, but are still rooted within the conventional process; the advertiser must still perform the demanding tasks of market analysis, segmentation, messaging, and campaign management. Other companies are already using keywords and semantic technology to improve the matching of existing advertiser-created messages with target segments, but the segmentation must be determined in advance by the advertiser. Analyzing a web page for its meaning allows them to better determine whether to target it with a given message, but the targeting is based on many difficult and expensive decisions on the part of the advertiser. Again, these examples represent technical improvements within the existing conventional process for advertising.

There is presently no technique directed to the over-riding process for advertising, to enable the discovery of the optimal market segmentation and messaging for promoted content; to identify and generate relevant relationships and messaging between an advertiser's content and an individual consumer that can be beneficially utilized by a consumer in response to a consumer action.

SUMMARY OF THE INVENTION

The present invention provides a computer network implementable method for synthesizing relevant messaging from one or more domains of information, underpinned by non-promoted content, using a consumer-generated context, the method comprising: (a) obtaining non-promoted content and linking the non-promoted content to at least one promoter; (b) receiving a consumer-generated context; and (c) semantically analyzing and synthesizing, or facilitating the semantic analysis and synthesis, by one or more computer processors, relevant messaging based on the non-promoted content and the consumer-generated context, wherein the relevant messaging is traceable to the at least one promoter.

The present invention also provides a computer system for synthesizing relevant messaging from one or more domains of information, underpinned by non-promoted content, using a consumer-generated context over a computer network linked to a plurality of computing devices, the system comprising: (a) a first set of computing devices, and a second set of computing devices for obtaining non-promoted content associated with the first set of computing devices, wherein the non-promoted content is linked to at least one promoter; (b) a third set of computing devices for obtaining, receiving or generating the consumer-generated context and providing the consumer-generated context to the second set of computing devices; and (c) a semantic analyzing means and a semantic synthesizing means linked to the second set of computing devices for synthesizing relevant messaging based on the non-promoted content and the consumer-generated context, wherein the relevant messaging is traceable to the at least one promoter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 7 illustrates a semantically synthesized web page.

DETAILED DESCRIPTION OF THE INVENTION

Definitions

Figure 1:
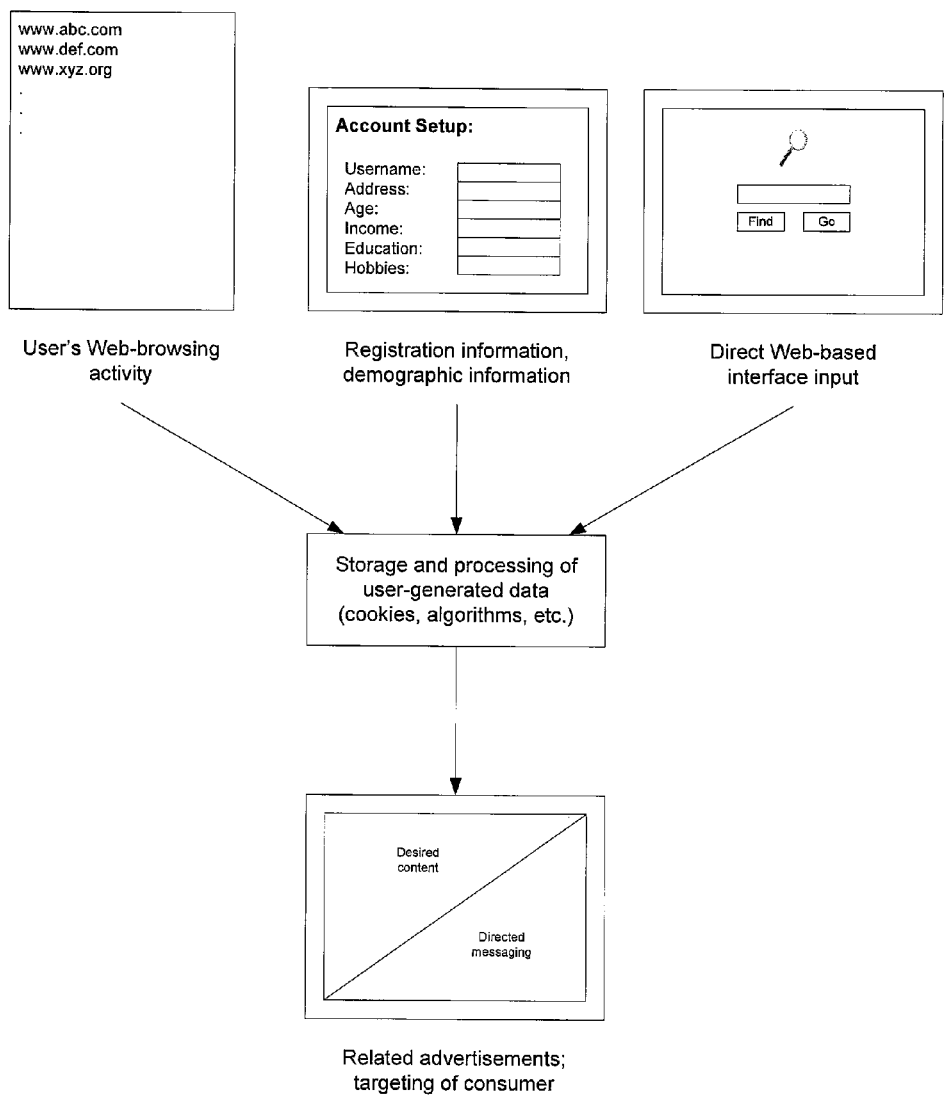
FIG. 1 illustrates relevance matching between promoters' messaging and media placements.

The following words, when used in the present specification, have the following meanings:

"concepts" means content constituting abstract thoughts, ideas, conceptualizations, and semantics that may or may not be associated with other content;

"consumer" includes any entity to whom synthesized messaging created in accordance with the present invention is directed; it may be a person, a collection of people, or in other system integration scenarios a consumer may be a machine-based consumer of the information in support of further processing;

"content" includes any data or media content including raw data, information, text, documents, images, or multimedia, more complex content such as web pages or websites, documents, advertisements, market analytics, etc. "content" includes information that describes other content, such as semantic data, metadata, and information that describes abstract "concepts";

"domain" means a source of content that is made available to the present invention;

"domain administrator" includes any entity that makes available to the present invention one or more domains; domain administrators may be "promoters" but may also be service operators of the present invention, or non-affiliated individuals or organizations within the broader value chain (such as public website operators);

"media representation" provides the container for the promoted message or messaging, which may take different forms across different media, such as text, audio, video, etc., so that the same message or messaging may be represented in different forms to suit the media;

"message" or "messaging" includes the synthesized content created in accordance with the present invention and directed to a consumer;

"non-promoted content" has the meaning provided in the Overview, below;

"promoted content" has the meaning provided in the Overview, below;

"promoter" includes an entity that wishes to benefit from the present invention by directing messaging, whether for promoting specific content, seeding concepts or content, or influencing a consumer to read or view content, think about ideas, take an action (such as visit a website), etc.; and "seed" or "seeding" includes directing "concepts" or other high level content to consumers in order to identify reaction of consumers with such concepts or other high level content in order to gather information regarding consumers, such as their interests, requirements, intentions, or otherwise.

Overview

The present invention provides a computer system, computer implemented method, and computer program, to create messaging based on, or informed by, one or more domains of content and to direct a consumer of the domain to, or present to a consumer of the domain, messaging comprising relevant content from one or more domains. Content can be utilized for a wide range of purposes as outlined below, whether for a specific commercial purpose such as generating messaging such as advertising, or influencing the creation of new content by presenting ideas from a domain that embody "looser" associations to encourage lateral thinking by the consumers. The created messaging provides advertising process automation.

In accordance with the present invention, the domain may be semantically analyzed, and a means of semantic synthesis may be used for generating or creating a semantic network to represent the domain. The semantic network may be a thought network, in accordance with that disclosed in PCT/CA2009/000567, however, it should be understood that other means for generating or creating a semantic network may be used.

In order to aid in the understanding of the invention the operation of the invention is explained from the perspective of the varying purposes of interacting with the present invention, and the different processes for creating and displaying messaging that are enabled by the functionality of the present invention. The present invention includes interaction between a promoter and the functionality of the present invention, wherein the promoter directs messaging created by the present invention to a consumer based on non-promoted content.

By operation of the invention, a promoter is able to direct a consumer to messaging comprising the content from the domain by seeding "concepts" or other content in the domain (a specific example of "seeding" is provided below under the heading "Providing a Domain of Information and a Semantic Representation of the Domain". The present invention discovers relations between the seeded concepts or content and the promoted or non-promoted content within the domain of information. The promoter may direct a domain administrator to use as underpinning for the domain, non-promoted content that are already part of the domain. The present invention could automatically provide the relations, however a promoter or domain administrator may leverage their knowledge of the relations that may be made in order to appropriately seed concepts and/or content. Connections can be created or inferred (for example, hyperlinks that encode links between data, documents, semantics, or other informational entities) between the non-promoted content and the particular concepts or other content. The promoter may optionally supply concepts or other content directly to the domain as promoted content. The non-promoted content that comprises the underpinning of the domain may be combined, integrated or blended prior to a consumer interaction with the domain.

A consumer can interact with the semantic network representing the domain. When the consumer interacts with the semantic network, consumer interaction information (which provides a context) interacts with this combined, integrated or blended content and delivers messaging comprising content derived from the underpinning of the domain, which may include promoted content, non-promoted content, or new content, to the consumer based on the concepts and content and the connections between the concepts or other content and the domain. The consumer perceives the message, for example, as part of a consumer experience but in fact is receiving a specific message tuned to the specific consumer interaction (consumer input or other consumer action) at hand by operation of the present invention. Also, the combination, integration or blending by semantic analysis and/or synthesis can be used to position the message in an association that is close to the consumer interaction occurring in that instant.

This integration and interaction approach displaces the current practise of matching a promoted message, for example to a consumer based on media placement, in a way that it is believed will be of interest to the consumer. The integration and interaction approach is responsive to actual consumer interaction rather than consumer interaction that is likely in relation to a particular media placement location, therefore enabling more targeted messaging (such as advertising). In addition, the promoter need not incur the time and cost of creating relatively complex messaging such as advertisements, or multiple versions of advertisements for different consumer contexts, but rather may simply provide the underpinning of the domain by integrating content with many different consumer contexts by leveraging the creation of, through the operation of the present invention, messaging closely associated with such different consumer contexts.

Furthermore, the promoter is able to direct the consumer to the messaging by leveraging the domain and the connections between the concepts or other content represented by the domain and the consumer.

The promoted content may be created or generated from a number of sources. For example, the promoted content may be any content created by or for a promoter, or collected by or for a promoter, whether for monetary or non-monetary purposes. This may include content for which the promoter is willing to pay for distribution to a consumer. An example of such content is advertising that includes hyperlinks to a related website, wherein the promoter is interested in ensuring that advertising reaches a target audience.

The non-promoted content may be content that exists in the domain without any current contribution or collection by or on behalf of the promoter. The non-promoted content could relate to previously contributed information (for example, advertisements that were used in previous advertising campaigns), contributions by others not associated with the promoter, or generally available content (e.g. content obtained from public domains).

A domain administrator administering or facilitating the use of the present invention may create or facilitate the creation or inference of connections between the non-promoted content and concepts or other content of interest to the promoter. The domain administrator has knowledge of the connections in the domain and can target particular consumer contexts to the concepts or other content of interest to or desired by the promoter. Thus, the consumer experiences an automated process whereby it receives messaging desirable to the promoter. The promoter can direct this messaging to a consumer without being required to provide promoted content.

It should be understood in the present invention that the functions provided herein may be performed by different entities. For example, the domain administrator may facilitate the selection or accumulation of non-promoted content, whereas another entity may determine what consumers are interested in, and yet another may allow the connection or inference between the content and the consumer interest. The entity can use automated means for performing these processes. Additionally, the various functionalities of the present invention can be distributed across a plurality of different computer systems.

It should also be understood that promoted content and non-promoted content in certain cases are not mutually exclusive. For example, a promoter may want to promote specific content within a domain of publicly available content made available by the promoter. The specific content may be put forward by the promoter (promoted content), and also be represented in the broader domain of publicly available information used as the underpinning for the promoted information objects (i.e. non-promoted content).

To enable the directing of a consumer to the messaging or presenting of the messaging to a consumer, the present invention comprises a computer network implemented method to create or generate a semantic network, including receiving promoted or non-promoted content, semantically analyzing the content and combining, integrating or blending the content by generating semantic representations of concepts (hereafter, "concept definitions"), such that a media representation of the relevant promoted or non-promoted content within the generated concept definitions is traceable to the promoter. Additionally, the concept definitions that are generated may be used as part of the non-promoted content.

The generated concept definitions are compared to consumer interaction information, and relevant concept definitions may be semantically synthesized along with the consumer interaction information into consumer concept definitions with promoted and non-promoted content, such that a media representation of relevant promoted or non-promoted content within the synthesized consumer concept definitions is traceable to the promoter and is provided to the consumer.

It should be understood that the sequence of the steps performed in carrying out the invention are not essential to the operation of the invention. For example, the system can obtain a consumer interaction information before, concurrently, or after obtaining promoted and optionally non-promoted content. For clarity, it will generally be the case that the promoted and optionally non-promoted content is obtained prior to the consumer interaction information, but the order can be changed without affecting the invention.

The present invention also comprises a computer-network-based implementation that includes simultaneously receiving promoted content and non-promoted content, semantically analyzing the promoted content with the non-promoted content and combining, integrating or blending the promoted content with the non-promoted content at a consumer interaction stage, such that such that a media representation of relevant promoted or non-promoted content within the combined, integrated or blended content is traceable to a promoter. The consumer interaction, with the semantically analyzed content, results in messaging that is a semantic synthesis of the relevant semantically analyzed content to be displayed as part of a network web page, for example, such that the combined, integrated or blended content is in a hypertext format.

The present invention further comprises a computer-network-implementable method to combine, integrate or blend consumer interaction information with promoted and non-promoted content by semantically synthesizing all content with the consumer interaction information into consumer concept definitions, such that a media representation of relevant promoted or non-promoted content within the synthesized consumer concept definitions is traceable to a promoter.

The present invention still further comprises a system for executing a computer-network-implementable method to combine, integrate or blend promoted and non-promoted content before a consumer interaction with the network, the system comprising a computer network, means to receive content, means to perform semantic analysis, and means to output combined, integrated or blended synthesized content on the network, the system operable to receive promoted and non-promoted content, semantically analyze the content and combine, integrate or blend the content by generating concept definitions, such that a media representation of relevant promoted or non-promoted content within the generated concept definitions is traceable to a promoter.

In the present invention, the full implementation of the invention is operable on a distributed and networked computing environment. This includes implementation of the invention based on Internet-based technology development and service development wherein users are able to access technology-enabled services "in the cloud" without knowledge of, expertise with, or control over the technology infrastructure that supports them ("cloud computing"). Internet-based computing further includes software as a service ("SaaS"), distributed web services, variants described under Web 2.0 and Web 3.0 models, and other Internet-based distribution mechanisms. In order to illustrate the implementation of the present invention in such distributed and networked computing environments, including through cloud computing, the disclosure refers to certain implementations of the invention using multiple sets of computers. It should be understood that the present invention is not limited to its implementation on any particular computer system, architecture or network. It should also be understood that the present invention is not limited to a wired network and is implementable using mobile computers and wireless networking architectures, for example by linking wireless devices to the system by a wireless gateway.

Typically, at least one set of computing devices would generate or retrieve and send the promoted or non-promoted content (or both) over the network to a second set of computing devices to stage, semantically analyze and synthesize relevant content to provide a domain of information, and at least a third set of computing devices from which the consumer interaction information originates sends the consumer interaction information to the second set of computing devices, where it is received. The third set of computing devices also receives the messaging provided by the second set of computing devices over the network and displays the messaging to the consumer.

The present invention may include a feedback loop from the output to the analysis stage (or to the synthesis stage). This represents a feedback report on the performance of promoted or non-promoted content that comprise the message displayed within the output, as well as a mechanism for revealing to the promoter the market segmentation and other market analytics discovered by the system. The semantic analysis and synthesis processes are adaptive to the performance report, with resulting adjustment to more optimally integrate the promoted or directed content into the messaging over time.

Providing a Domain of Information and a Semantic Representation of the Domain

As earlier stated, the present invention provides a system, computer network implementable method and computer program to create or generate messaging based on, or informed by, a domain of information and direct a consumer of the domain to the messaging, which comprises relevant content.

A promoter of the particular information is able to direct the consumer to the messaging by seeding concepts or other content in the domain to provide the underpinning of the domain. The seeded concepts or other content may relate to promoted or non-promoted content within the domain of information. For example, the promoter may supply the concepts directly to the domain as promoted content or may direct a domain administrator to mine or create non-promoted content that is already part of the domain and create or facilitate the creation or inference of connections by automated means between the non-promoted content and the concepts desired by the promoter. The promoted and non-promoted content are combined, integrated or blended prior to a consumer interaction with the domain.

For clarification purposes, the domain comprises either or both of promoted or non-promoted content.

It should be understood that promoted content need not be created by the promoter. It could instead comprise non-promoted content that is collected and contributed by the promoter to the domain, or this could be done on the promoter's behalf. The promoter, or an entity on its behalf, creates or collects content that creates or facilitates the creation of connections between a particular context and the message to which the consumer is directed.

Non-promoted content, on the other hand, may be content that exists in the domain without any current contribution or collection by the promoter. The non-promoted content could relate to previously contributed information (for example, advertisements that were used in previous advertising campaigns), or contributions by others not tied to the promoter. A domain administrator can mine this information to create or facilitate the creation or inference of connections by automated means between the non-promoted content and concepts or other content desired by the promoter. The non-promoted content may also consist of publicly available information (public domains) that by operation of the invention can provide the underpinning for the creation of content.

The domain administrator may have access to one or more domains that contain non-promoted content that is semantically relevant to the promoter. The domain administrator may have knowledge of the connections in each domain and can target particular consumer contexts to the concepts or other content desired by the promoter. Thus the promoter can direct a consumer to the messaging without being required to provide promoted content.

For example, the domain administrator may compile a list of keywords or terms that relate to other keywords or terms. A promoter can consult with the domain administrator regarding non-promoted content to which it desires connections and can engage the domain administrator to create or discover connections between keywords and terms, relevant to a given context, on such a list with other terms of relevant non-promoted content. These new connections, when semantically analyzed with the domain and when the semantic network is created or generated, enable a consumer to be directed to messaging comprising the content when a given context is provided by the consumer. It should be understood that the domain administrator can use automated processes to carry out its functions, including for example assembling content from the one or more domains The domain, comprising either or both of promoted or non-promoted content, may be semantically analyzed and a means of semantic synthesis may be used for generating or creating a semantic network to represent the domain. The semantic network may be a thought network, in accordance with that disclosed in PCT/CA2009/000567, as previously described.

A consumer can interact with the semantic network representing the domain. When the consumer interacts with the network, consumer interaction information (which provides a context) interacts with this combined, integrated or blended content and delivers a directed message to the consumer based on the concepts and the connections between the concepts and the domain. The consumer is provided with a media representation of the directed message as part of a consumer experience. The combination, integration or blending by semantic analysis and synthesis can be used to position the message as close as possible to the consumer interaction tasks at that instant.

The one or more domains providing non-promoted content for the messaging can be selected as directed by the domain administrator or on an automated basis. For example, the one or more domains can be selected based on consumer interaction information or other consumer-generated context. The one or more domains can also be selected as a subset, either randomly or on a systemic basis, from a plurality of domains that are semantically relevant to the consumer interaction information, for example where only a limited amount of non-promoted content is required for the messaging, but a greater amount of non-promoted content is available across the plurality of domains.

The consumer interaction information may be consumer driven or machine driven. For example, consumer interaction information may include consumer input provided via a user interface, consumer demographic information, consumer browsing information, machine generated data, GPS data, sensor data, or any combination thereof. The consumer input may be provided in response to a web based search query. The consumer browsing information can also be analysed to determine a major theme or themes of consumer browsing (such as one that recurs or is dominant relative to other themes).

Alternatively, the consumer may store information, for example thoughts, gathered during the course of one or more consumer interactions. Further still, the consumer may select content for gathering of consumer interaction information, for example by selecting part of a web page, document or email. The thoughts or selection can be set aside by the consumer, or by the present invention as so configured, and later provided as the consumer interaction information. A tool could be provided for enabling the consumer to set aside these thoughts and selections and provide them as the consumer interaction information by a consumer action or on an automated basis.

Additionally, the consumer interaction information can be provided in real-time, on a delayed basis, or in a collective set. A collective set of consumer interactions which, for example, may consist of a set built up over time and processed on a set frequency or a set built up to a threshold number of consumer interactions, can be processed together by the system. The collective set can be parsed prior to its use with the system.

This integration and interaction approach displaces the current practise of matching message to media placement. The promoter, therefore, does not have to incur the time and expense of creating and disseminating several complex and intricate promoted materials since the promoter can simply use the present invention to automatically integrate content with many different consumer contexts. Through the present invention, the promoter is able to direct the consumer to the messaging by leveraging the underpinnings of the domain and the connections between the concepts represented by the domain and the consumer.

To enable the directing of a consumer of the domain to the messaging, the present invention comprises a computer network implementable method to create or generate a semantic network, including receiving promoted or non-promoted content, semantically analyzing the content and combining, integrating or blending the content by generating concept definitions, such that a media representation of the relevant promoted or non-promoted content within the generated concept definitions is traceable to the promoter. The generated concept definitions are compared to a consumer interaction information, and relevant concept definitions are semantically synthesized along with the consumer interaction information into consumer concept definitions with promoted and non-promoted content, such that a media representation of relevant promoted or non-promoted content within the synthesized consumer concept definitions is traceable to the promoter and is provided to the consumer.

Combining, Integrating or Blending Promoted and Non Promoted Content

The present invention provides an interactive consumer experience wherein shaping of messaging that is consumer directed information is based substantially on consumer participation. The consumer may be an existing or potential customer or existing customer or end-user of a product or service. The messaging may include promoted and non-promoted content. The promoted content may be, for example, any content that are desired by a promoter to be included in the consumer directed information for a consumer, as previously described. For example, the promoter may be an advertiser promoting the sales of a product or service, a political advocacy group promoting a particular cause, a government body distributing information into the public domain, a community or social group distributing information to its members, among many other use cases. The messaging may include advertisements and/or other communications directed to a consumer, or an information product, for example information created specifically for the consumer and based on a consumer interaction. The messaging may also include non-promoted content, for example publicly provided content or content enabling the creation or inference of connections to the consumer interaction.

Messaging may be created by inferring connections between a consumer context and the promoted content, non-promoted content and related content. The connections may be inferred using a means of semantic synthesis. The resulting consumer directed content are conceptually relevant to the consumer context.

The interactive consumer experience could also be implemented by utilizing the information source of promoted content (for example, a promoted communication), for example an advertisement or other message, to bypass the relevance matching process by performing an information process on not just the consumer-related or created content, but also on the information source. This approach enables consumers, through their own activity, to automatically find and interact with conceptually relevant promoted or non-promoted content and enables these consumers to shape in real-time both the consumer context and the messaging.

Where the promoted content consist of advertising-related content, an approach to processing the information source of promoted content with non-promoted content may disrupt much of the onerous practices of conventional advertising at the process level. With it, consumers, not promoters, can shape both the consumer context and the messaging, allowing advertisers to bypass much of the hard work in such areas as market analysis, strategy development and positioning steps that are generally required to effectively direct messaging to consumers with a particular purpose in mind. Further, there is no longer a need for expensive and time-consuming communication development, audience segmentation, or complex media buying and placement activities, thus dramatically lowering the cost of advertising and promotion. Additionally, the messaging and associated relevant promoted or non-promoted content, and an effective context for their presentation, are defined by the consumer, not the promoter, increasing the overall effectiveness of the messaging. Another major advantage is that properly targeted and timed messages are perceived by consumers as useful information, not an annoyance (unlike most advertising as delivered under the conventional process). Moreover, market feedback and analysis are greatly simplified by displacing traditionally laborious upfront activities with market analytics that are automatically discovered and reported through the operation of the present invention. The present invention thus provides a discovery-based mode of advertising and promotion, since the promoters do not need to precisely define and target their audiences. Broader and unanticipated audiences are another advantage of this discovery-based approach. Since the requirements of market analysis and segmentation are diminished or displaced entirely, promoters can promote activities without a precise definition of their audience and in turn learn what are the optimal audiences and markets for their promotional needs. Further, advertisers can discover what aspects of their content resonate with the market, enabling them to make appropriate adjustments to their content.

Semantic synthesis may be provided for performing synthesis on a lexicon of terms provided by the results of a semantic analysis on a domain of information. A means of semantic analysis may optionally be provided for generating consumer concept definitions that are input for semantic synthesis. In one particular implementation of the present invention, semantic analysis and synthesis are applied to the problem space of promoting content to consumers. It simplifies and disrupts the conventional approach by displacing many of the conventional activities altogether. The present invention may be enabled by a process such as that illustrated in FIG. 4, which is more fully described below. The system enabled by the present invention, in accordance with this aspect, may include the steps of staging, analysis, synthesis, generation of consumer concept definitions, output, and feedback, as is more fully described below. This process could furthermore be made dependent on limitations to achieve real-time process efficiency. In other words, a consumer interaction in accordance with the present invention can result in meaningful output within particular constraints to provide a more cost-effective result. The constraints may be provided for optimizing the system based on physical limitations presented by the system or environment. For example, the limitations may include staging, analysis or generation time limits based on processing time, available CPU cycles or maximum CPU cycles desired to be used, limits on the volume of data to be occupied, bandwidth limitations, or any other meaningful limitation that can impact the performance of the system.

Alternatively, instead of requiring staging and semantic analysis of the domain, a domain of already analysed content can be provided. For example, an annotated domain or structured domain providing a semantically analyzed domain can be used by the system.

In addition, the means for semantic analysis, if provided, could be provided by a third party and/or at a remote location. Input to the semantic synthesis stage could be provided by obtaining or receiving semantic analysis rather than generating it.

The system may load, retrieve or otherwise be provided with content from sources the promoter creates or collects and provides or identifies, and it may deconstruct this content to an elemental level. In response to a consumer action, the system may create messaging, for example advertisements assembled from those elements, using information about consumer context to ensure that the messaging is relevant and appropriate. The content could be created or derived by an entity based on the consumer's interests, which could be based on indirect means, for example, websites the consumer is visiting, profiling data such as social networking profiles, or service usage analytics and logs. Another entity could process promoted content, while a third entity could manage the connection between the information and the promoted content. The third entity can provide the messaging to the consumer's computing device for output. The system may collect data regarding the nature and volume of the messaging it creates. From this, it may create reports that the promoter can use to make adjustments to its source content and to monitor its promotion.

The system may be implemented using a distributed and networked computing environment comprising, for example, at least three sets of computing devices including devices associated with the source promoted content, the consumer, and the processing engines described herein. The consumer may provide inputs and receive outputs from the computing devices using a consumer interface, or the consumer information could be provided by other means, such as tracking of demographic information or browsing information related to the consumer.

Matching Advertisement to Consumer

The following describes an implementation of the present invention wherein the underpinning of the domain is promoted content consisting of advertising. The non-promoted content in this example consists of content available in the public domain. However, it should be understood that the underpinning of the domain can be non-promoted content, for example where a domain administrator enables or facilitates the creation or inference of connections between the non-promoted content and the domain of information.

The present invention provides a computer-implemented method and system to match advertisement source content in a media representation (such as a web page) with a consumer-generated input on a network such as the Internet. The domain of information could comprise all or a subset of media representations (such as web pages and other digital media) on the Internet.

In contrast to the practice common in conventional prior art given by FIG. 1, where consumer-generated information is matched with an advertisement, the present invention uses advertisement source content to match to a consumer. This can be implemented by deconstructing the advertisement source content to an atomic level (that is, deconstructing many different concepts that taken together comprise the meaning of the advertisement) and synthesizing messaging leads that are associated with the atomised concepts. The advertisement source content is semantically analyzed with the domain of information, or provided to the system, and a means of semantic synthesis of the collection of atomised concepts provides a semantic network for representing the domain (including the source content). Possible methods for semantic analysis and synthesis are more fully described below.

The atomised concepts here refer to elemental concepts that may be progressively broken down further into increasingly narrow meaning. Correspondingly, while the messaging leads as a whole casts a wide net around consumer-generated information, they can further get matched individually to measurable semantic differences of consumer interests within a unique topic. This micro-level matching bypasses the whole process of relevance matching, by combining, integrating or blending consumer interests with advertisement source content that has already been combined, integrated or blended with relevant public and/or private domain information.

Figure 2:
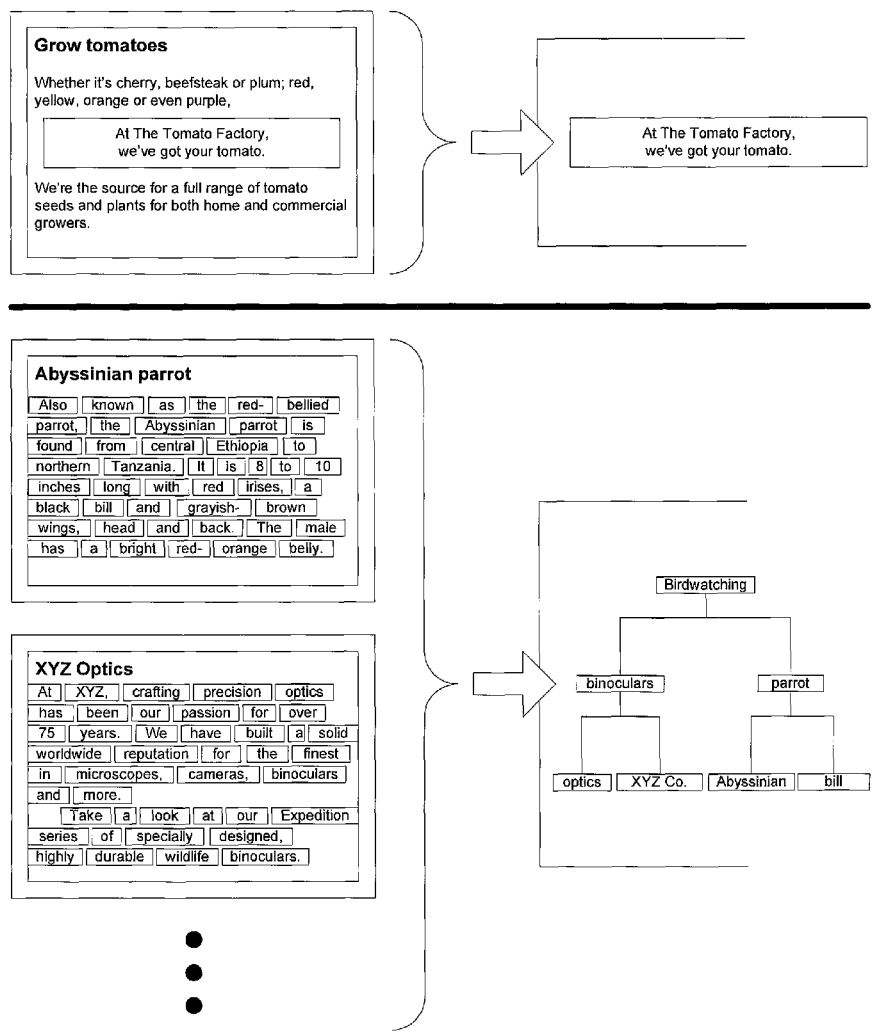
FIG. 2 illustrates a comparison between a prior art approach and the present invention where the present invention makes a promoter's content available through dispersed concepts.

A comparison between prior art approaches and the present invention is illustrated by FIG. 2, where the prior art advertisement is conveyed to a consumer in whole. In contrast, as shown in the lower part FIG. 2, the present invention makes promoted or non-promoted content available by attaching them to concepts dispersed across an output, wherein the output is a result of consumer-defined context, which forms the basis for one or more messages.

Figure 3:
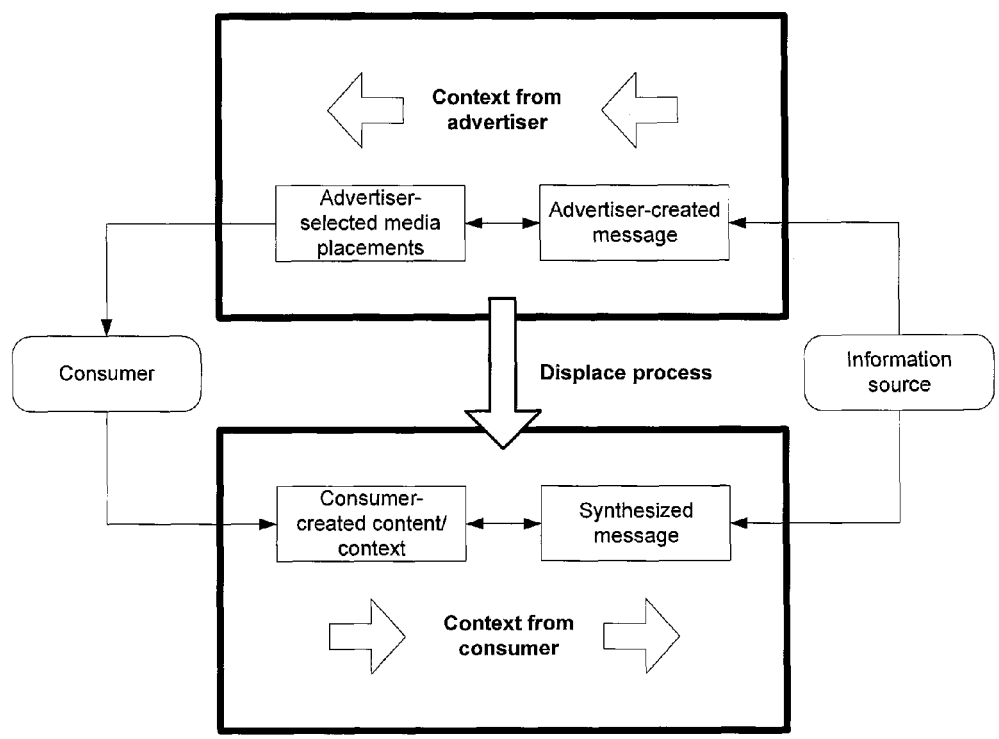
FIG. 3 illustrates bypassing of the process where a promoted message is matched to media placement.

As shown in FIG. 3, by semantically engineering the context of a message into messaging leads, it is possible to match the message to context from consumers (in this case web users) at a very refined level, thus bypassing media placement altogether. This is achieved by staging content from various sources. Staging of content refers to a phase where external content (from various sources, including the domain of information, promoted content, and non-promoted content) are mapped to the system schema. The external content may be identified based on criteria including the nature of the content that can be processed. For example, content from a selectable domain may include all content that is operable to be processed by a means of semantic analysis (including approaches such as natural language processing of unstructured text, named entity extraction, mapping to linked data through open standards for semantic representation, and many other approaches that are well known in the art).

External content may also be provided by other structured domains of information, for example semantically annotated web content or a thought network from one or more consumers. A tool may be provided for enabling a thought network to be provided as external content to be staged. It should be understood as well that other forms of external content can be provided.

Subsequently, staged content is deconstructed into semantically analyzed and annotated content that is then synthesized into a message that matches a consumer context created by consumer information. The semantic analysis of content refers to a phase where content from all sources has been deconstructed to an elemental level (atomised concepts) and is ready for semantic synthesis. The content may include promoted content, either directly disclosed or collected by the promoter, and non-promoted content, either from public websites or non-public sources, such as an intranet, RSS feeds, private blogs or any sources of network-available private content.

After the staging and analysis of content, the processed advertisement source content may include messaging leads synthesized using the atomised concepts or elemental content from the content source of the advertisement message. The source of this content may be any source linked to a promoter including, for example, an advertiser's web page, a third-party web page containing an advertisement for the promoter, direct content disclosed by the promoter, content linked by a promoter, content related to a promoter's product, technical content relating to advertiser promoter or its products, etc. An additional source for content may be provided by facilitating promoters with a self-service utility having a user interface. This self-service utility would allow promoters to register and disclose, online, their information source, whether it be a link to a website or direct material submission. The promoters would be able to choose from a selectable options list to enter into a commercial transaction for the service with which they would be provided. Once the synthesized messaging is positioned within the consumer-generated context, the promoter's interactive information may be made available to consumer interactions. This enables the promoter to enter into transactions with consumers in a way that is more conceptually relevant to the consumer context.

For example, a promoter might register through the self-service utility to identify one or more domains as a source for consumer interactions. A website or an online store are examples of this type of domain. Consumers that are existing users of these domains, such as customers at a store, may elect to include these domains as a source of their synthesized information and messaging. In one example, a customer of an online electronics store may wish to be informed of related products from this store as they are exploring subjects related to electronics. There are numerous monetization and revenue models to support this type of promoter-consumer interaction, including affiliate models, transactional advertising models, sponsorship models, and many others.

Figure 4:
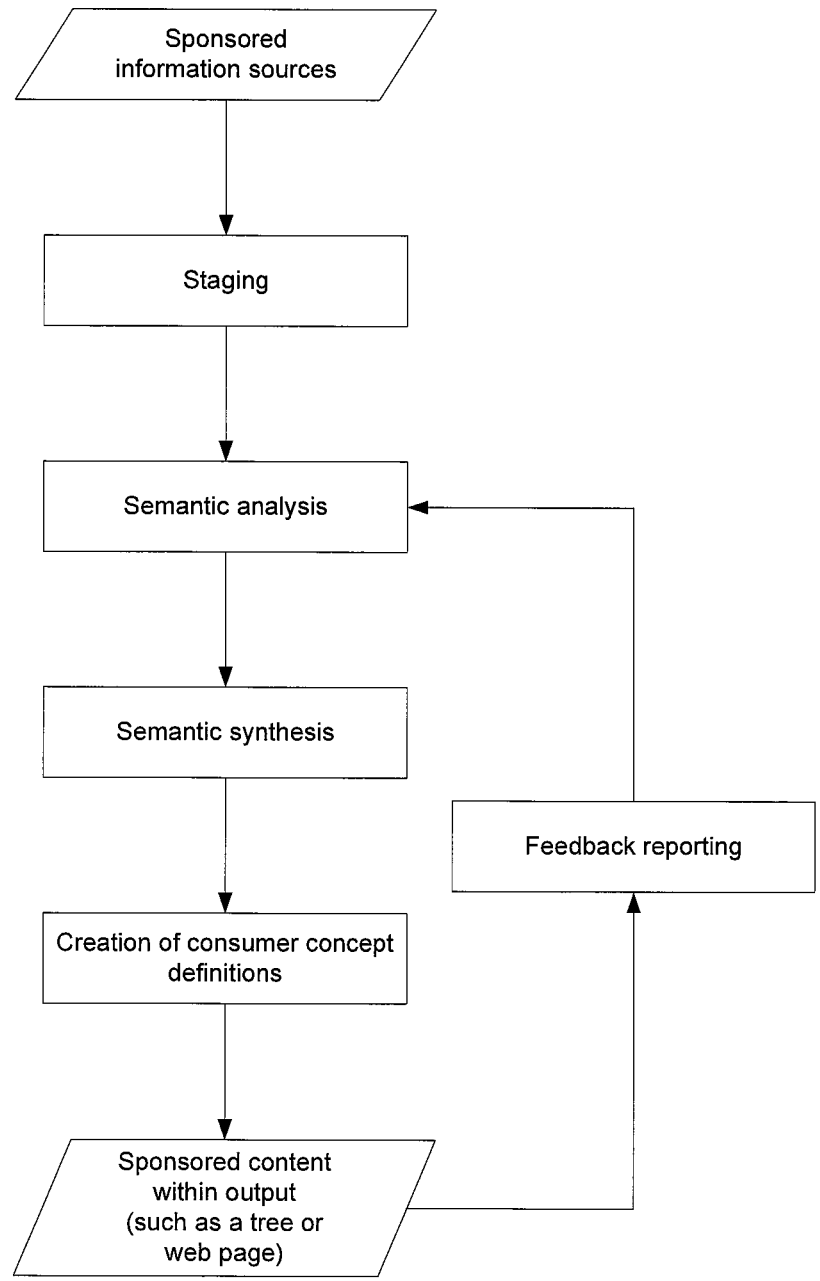
FIG. 4 illustrates a process where promoted content is a processed integral output.
Figure 5:
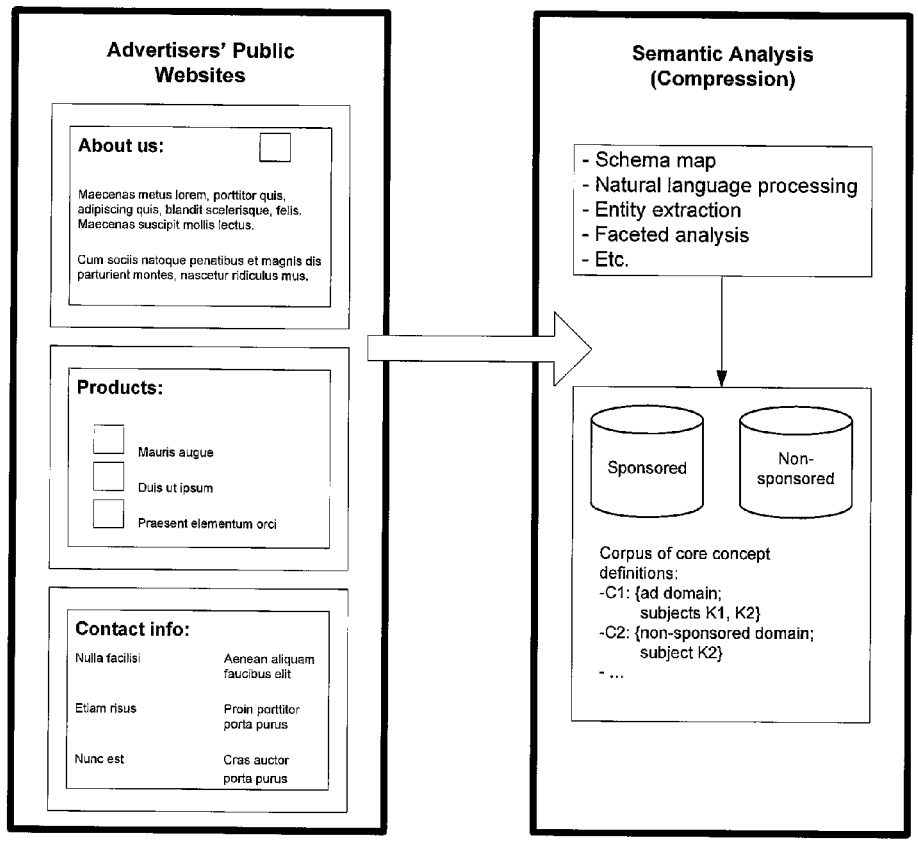
FIG. 5 illustrates an analysis stage where a message is grouped with non-promoted content as part of the concept definition generated by various algorithms.
Figure 6:
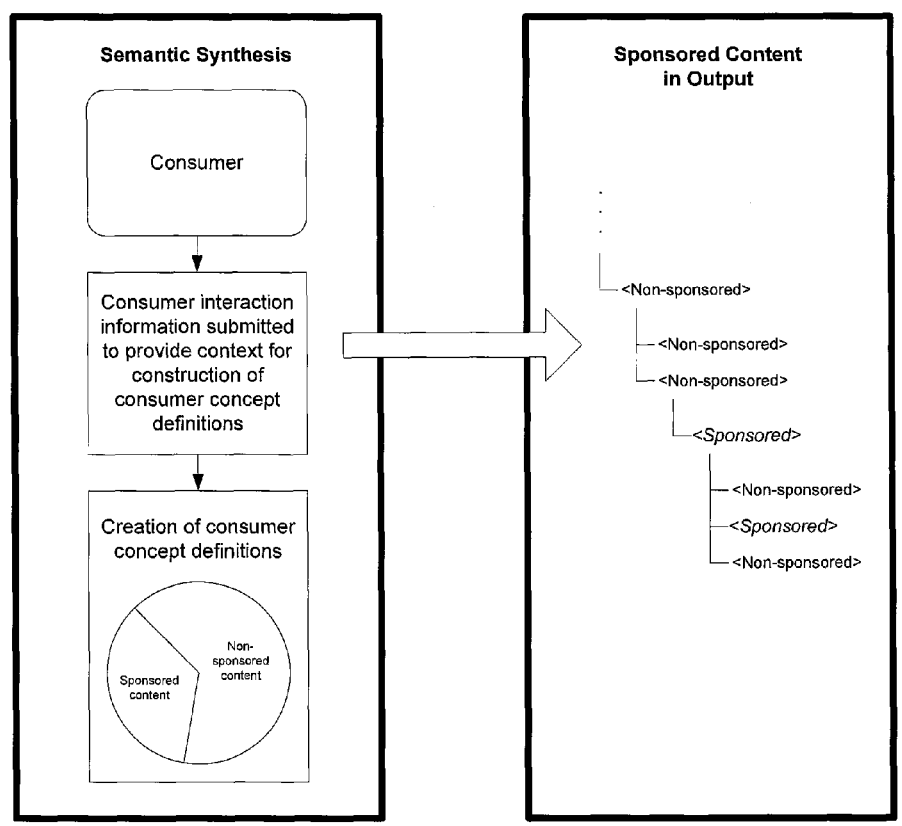
FIG. 6 illustrates a synthesis stage where a consumer-related input initiates semantic synthesis.

With reference to FIG. 4, FIG. 5 and FIG. 6, the advertisement information source, such as a public website, may be provided as input to staging to prepare it for generation or creation of semantic representation along with the public and other related content, which for example may be processed by semantic analysis. The means for generating or creating semantic representation may produce consumer concept definitions relevant to the consumer context.

Semantic analysis, as one example of a means for generating or creating these consumer concept definitions, can be performed using a number of approaches including, but not limited to, schema mapping, statistical clustering, natural language processing, entity extraction and facet analysis. In the semantic analysis stage, the advertisement information is processed along with non-promoted information and is tracked. The information generated through the analysis stage may be stored in the form of semantic representations such as concept definitions, where the advertiser information is grouped with relevant subjects.

An example is:
Concept definition C: {domain advertisement 1, Subjects k1, k2}
Concept definition C1: {Sunrise Apple Farms, Apple, Farm}
Concept definition C2: {Great Furniture Co, Chair, Table, Wood}

As previously mentioned, instead of requiring staging and semantic analysis of the domain, a domain of already analysed content can be provided.

The semantic analysis stage may be followed by a semantic synthesis stage where consumer interaction information is submitted to generate or create semantic representations, such as consumer concept definitions. The consumer interaction information may be consumer-provided information, including search queries, semantic networking creation information or consumer-related collected information, such as demographic information, content of a third-party website that has been browsed by the consumer or a browsing history that is submitted to construct consumer concept definitions. The semantic network to be created could, for example, be a thought network, wherein the consumer interaction information is part of building the thought network and the output is a web page with content organized and collated by the resulting thought network.

The semantic synthesis may be performed using any number of semantic synthesis approaches, including but not limited to, faceted classification, semantic reasoners, formal concept analysis, multi-document summarization or a hybrid semantic synthesis protocol that combines many such approaches. Consumer concept definitions are concepts made from relevant concept definitions related to consumer-submitted information as shown in FIG. 6. The consumer concept definitions are created by applying semantic synthesis rules, which might be dependent on the type of algorithm being used. At all phases of semantic processing, promoted or non-promoted content in a media representation can be traceable to a promoter (such as an advertiser). Making promoted or non-promoted content in a media representation traceable to a promoter could be implemented, for example, by providing a unique identifier (ID) for each promoted or non-promoted content. The media representation generated by the semantic synthesis may also be linked to the ID so that the media representation is linked to the promoter. This traceability enables not only the identification of the promoter for specific represented content, but also the feedback loop described herein.

The combined, integrated or blended output of promoted and non-promoted content essentially complete the process whereby the combined, integrated or blended semantically synthesized content are now ready to be utilized as a base for a wide range of applications including developing knowledge-bases, displaying search results, creating automatically-generated documents such as a web page as displayed by FIG. 7, or any other customized application taking a consumer input and displaying an output result. These applications will combine, integrate or blend the synthesized content within the media representation. One example of a media representations is shown in FIG. 7, wherein a web page being accessed by a consumer is modified by embedding the promoted content using the messaging leads.

As shown by FIG. 4, there could be a feedback loop from the output to the analysis stage and/or the synthesis stage. This represents a feedback report on the performance of the message within the media representations. By semantically processing the feedback report, the promoted or non-promoted content may be deconstructed and recombined, reintegrated or reblended into a variety of different messages and consumer-generated contexts. This feedback report is thus able to inform the promoter (an advertiser for example) as to the messaging and content that is resonating with consumers. It allows the promoter to avoid trying to predict and measure this effectiveness in advance, and rather discover the messaging and content that should be targeted. Metrics that may be used to inform this feedback report may include information about the number of times particular promoted content is clicked or followed-up (accessed), the followed-up/times-displayed ratio over all consumer contexts, and the followed-up/times-displayed ratio within each different consumer context.

The semantic processing of the feedback report can be at the analysis stage and/or the synthesis stage.

This performance report may be fed into the analysis stage, which may be automatically configured to adjust the display priority for promoted or non-promoted content. These display priorities may include removing or re-ordering a promoter's content from a certain consumer context, where it has a low followed-up/times-displayed ratio, to replace it with another promoter's content within the same consumer context. This process ensures a redistribution of promoted and non-promoted content takes place within a given consumer context. The redistribution may be further enhanced by automatically replacing optimally successful promoters for a given consumer context with other promoters after a certain definable or arbitrary time limit or for a trial basis. This step would make way for the exposure of new promoters testing their content.

The performance report may also or alternatively be fed back to the synthesis stage. The synthesis stage could adapt to those metrics which can be processed by the synthesis stage such as discontinuing a promoter and bringing in a new promoter or shuffling the priority of a promoter based upon feedback data, where the analysis need not be changed, just the priority.

A higher display priority for a promoter can also be used to assign a higher probability that the promoter's content will be displayed and/or to assign a higher number in an order sequence for display.

Content from a third-party website that is browsed by the consumer can also act as a context generator (providing consumer interaction information as well as the non-promoted content from which to generate messaging leads). A promoter can direct a domain administrator to enable or facilitate the creation or inference of connections between the content from the third-party website and the consumer context. The content from the third-party website would provide both context and non-promoted content that will be semantically processed along with promoted content. The semantic process may begin with staging, shift to analysis and eventually synthesize messaging based upon consumer context that is inferred or implied by the subject matter of the page. This aspect would support a distributed content network and would effectively outsource management of non-promoted content in a conventional promoter-publisher model. This distribution model would, for example, support the operations of advertising networks, affiliate networks, or similar multi-party promotion models.

Once the media representation is ready to be displayed, there are issues to deal with regarding placement of the number of messages suitable for the same place or page in the output. One way to deal with this issue is to make a simple adjustment affecting the display priority of messages by using a single parameter or a combination of parameters. Examples of parameters include, but are not limited to, relevancy, higher fees, and IP address locality of the consumer and/or GPS coordinates of the consumer for providing locally-relevant messages. Another plausible way of placing more promoted and/or non-promoted content in the messages is to time slice the results by updating the output in order to accommodate more than one promoter or message.

Monetization may take place upon display of a message within a media representation. Once the media representation is displayed, monetization may also take place after the consumer clicks the message or after an actual purchasing action takes place. Monetization may depend on a combination of transactions or interactions. Monetization may also depend, in portion, on the service of processing of promoted content at the semantic analysis stage. Another form of monetization would be by a CPM model, which refers to advertising bought on the basis of impressions. Further, another form of monetization could come from forwarding performance results and feedback reports to the promoter.

It should be understood that the present invention also provides matching of messaging (for example, advertising) to consumers based on only non-promoted content, i.e. without promoted content, without need for a promoter to provide any source domain information. In this example, the promoter may provide concepts only, without specifying content on which messaging created by operation of the invention will be based.

There are two main modes of operation of the invention for non-promoted content based messaging: (1) promoters influence the analysis and synthesis operations by manipulating parameters for creating content rather than providing promoted content other than the concepts; and (2) promoters take a "passive" approach to creation of messaging that is similar to "seeding" concepts as described above.

In the first mode of operation, a user interface provided by operation of the system can expose parameters within the system's analysis and synthesis methods to promoters. The promoters can use these parameters to bring about different outcomes in the analysis and synthesis of concepts and connections. Tuning these parameters can create a different consumer experience in relation to the created messaging, which can in turn be tied to specific promoter goals or objectives. For example, if the promoter wants to create a conservative impression in keeping with their brand, they can tighten the parameters to reduce the variability in the concepts and connections produced. Similarly, if a promoter wants to make more of a freewheeling, creative impression, the parameters can be tuned to increase the variability of concepts and connections produced. There are many ways to tie promotional objectives (such as marketing and branding objectives) to optimal system parameter configurations, simplifying operations for non-technical promoters.

In the second mode of operation, the promoter takes a passive role and does not try to influence the operations of the system through domain information or method parameters. Instead, the promoter selects from one or more possible promotional goals which a service design implemented by the system of the invention provides. These goals may include activities such as directing consumers to a specific website or supporting messaging for specific branding programs. As with the first mode, the system can align these goals to specific configurations of method parameters and community (public or shared) domains. In both modes of operation, the system can evolve and optimize advertising campaigns over time via the feedback loop described above.

For example, communities of users may represent the market as a whole. These communities may be an aggregation of consumers providing interactions, a focus group providing aggregate consumer interaction information, or a combination of the two wherein individual consumer interactions are first aggregated and then provided to the system. The community need not be structured, as individual consumers can be placed in a community by the system, based for example on shared interests of the consumers.

The community may create or add to the domain by contributing content or by linking to content external to the domain.

The system of the present invention can combine these modes of operation with other embodiments of the invention. For example, promoters may take a largely passive role, but still provide promoted content. Promoters may also provide promoted content implicitly by providing a website address as a goal. The system can then automatically harvest the website for particular promoted content. It should be understood that in this last example, by providing the website address, the advertiser will have still provided promoted content by putting forward a location where these can be found.

Implementation

Figure 8:
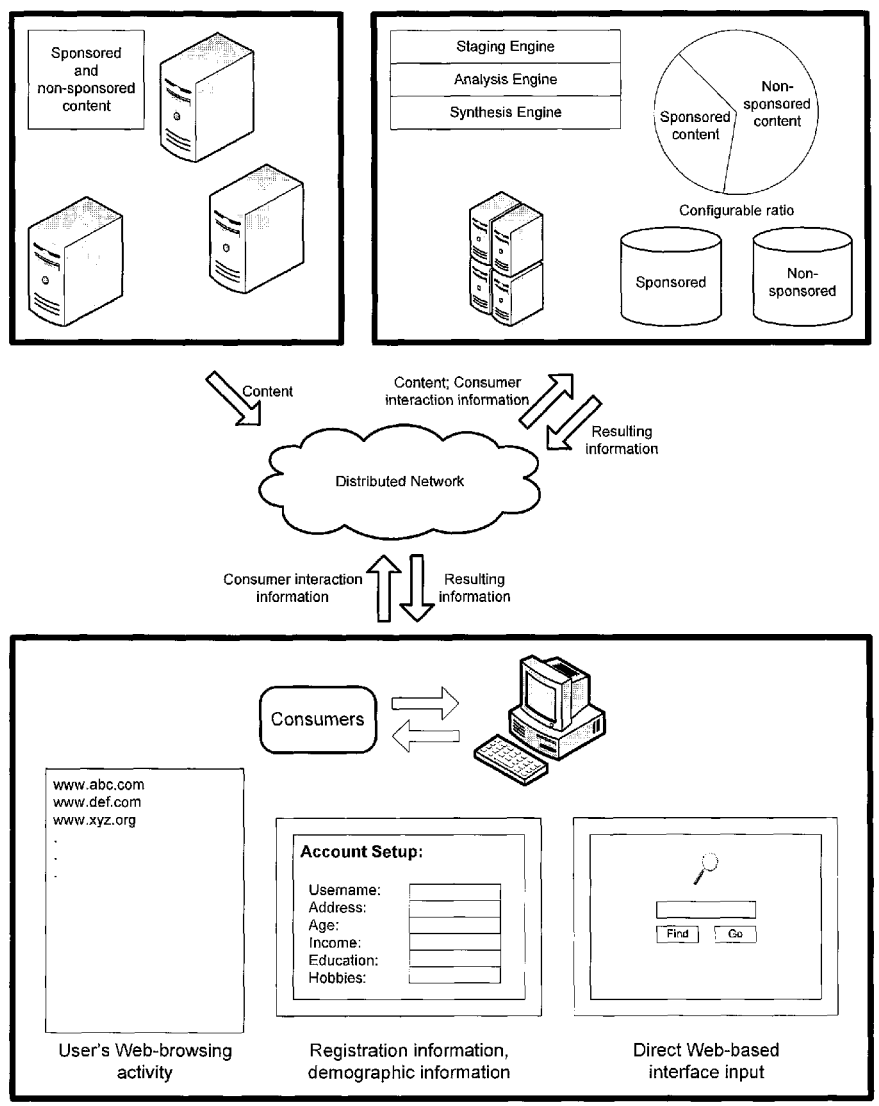
FIG. 8 illustrates a networked implementation in accordance with the present invention, in one aspect thereof.

FIG. 8 illustrates a networked implementation in accordance with the present invention. The present invention should not be considered to be limited to the particular network implementation illustrated. The present invention may be implemented using a distributed and networked computing environment comprising at least one computing device. In a particular implementation, at least three sets of computing devices may be provided. Each set of computing devices may comprise one or more computing devices linked by a network. Typically, at least one set of computing devices would generate and send the promoted and/or non-promoted content over the network to a second set of computing devices. The second set of computing devices receives the content, and may combine, integrate or blend the content. The second set of computing devices would stage, semantically analyze and synthesize relevant content. However, it should be understood that the generation of the content, the combination, integration or blending of content, and the analysis and synthesis of content may be processed on any number of computing devices from one to many.

At least a third set of computing devices may be used to obtain or receive or be the source of the consumer interaction information also sent to the second set of computing devices for further staging, analysis, and synthesis. Again, the consumer interaction information could be provided on the same computing devices as described above, or any number of other computing devices. The consumer interaction information may be consumer generated or machine generated. For example, the consumer interaction information may be generated by the consumer using an interface, which may be operable to receive queries or other contextual input from the consumer, may be generated using demographic information or browsing information related to the consumer, or may be provided as any other consumer interaction as described above. Machine generated consumer interaction information may be based on, for example, GPS data, other sensor data, etc. The third set of computing devices would also receive the resulting content and information over the network and display to the consumer the output that has been semantically customized by the second set of computing devices. The means for displaying the output could be a monitor or other display device linked to the third set of computing devices. In particular, where the third set of computing devices includes a wireless gateway and one or more wireless devices for displaying the output, the wireless devices may be equipped with video/image stabilizers, for example accelerometers, to enhance the user experience.

The consumer may be associated with a consumer profile linked to the third set of computing devices. The profile may be operable to link consumer information to the consumer each time the consumer interacts with the network. The consumer information can be provided back to the consumer as it is generated or created.

The second set of computing devices may be linked to a staging engine, analysis engine, and synthesis engine. The staging engine extracts, transforms, and loads content from the promoted content sources into the system for analysis. The system may maintain promoted content separately from non-promoted content, such as that from public sources. This may enable both tracing of the promoted content to a promoter and the ability to process promoted content differently than non-promoted content. The analysis engine deconstructs all the staged content, including promoted content, to an elemental level, extracting semantic data and compressing it into a semantic kernel. After analysis, promoted and non-promoted content may be maintained as separate data sources. The synthesis engine synthesizes the relevant promoted or non-promoted content into messaging leads that the system dynamically assembles into messages, which are the output of the system. The output may be provided to the consumer using the applications described above. In one aspect of the invention, the output is displayed in one or more web pages containing links in hypertext or hypermedia format. The links may be embedded based on the messaging leads linked to the promoted content, such as the promoter's website or other content provided by the promoter, as described above, or non-promoted content including public content linked to a promoter.

In a further implementation, synthesis could be provided on a computing device either local to or under the control of the consumer. The relevant messaging provided by the synthesis could, therefore, be kept under more private control of the consumer.

A utility may be provided wherein the engines can be configured to process promoted content and non-promoted content differently, so that it is more or less likely that promoted content will surface in the output to the consumer.

Furthermore, a facility may be provided for direct or indirect configuration of the ratio of promoted to non-promoted content placed in the output. The ratio may be determined based on the likelihood of particular promoters or classes of promoters having their content used. This content could be collected based on offline statistical analysis or real-time automated analysis. The facility could also be used to configure monetization as described above, or to configure the appropriate actions to be taken with respect to the performance report (for example, the display priorities) described above or the metrics described above.

It should be understood that further enhancements to the disclosed system, method and computer program are envisioned, and without limiting the generality of the foregoing, the following specific enhancements are envisioned.

Optionally, an additional initial step may be provided for performing a synthesis of a portion of the domain to enhance the performance of delivering relevant messaging to the consumer. For example, a portion of the domain can be input to the analysis and/or synthesis engine along with the consumer interaction information to provide relevant messaging faster than would otherwise be possible.

In addition, a pre-analysis stage could be provided to enhance the functionality of the invention, for example summarizing particular content prior to analysis and/or synthesis of the domain. For example, already existing semantic databases or already completed semantic representations may be input. The annotated web is a particular example of this type of content.

Furthermore, optionally a specific level of the domain could be defined for limiting the amount of the domain to interact with, for increasing performance.

Further enhancements may be provided wherein one or more of the computing devices are mobile devices or wirelessly networked devices. For example, the network may be or include a wireless network, the wireless network including a wireless gateway for linking the wireless network to the Internet. The first set of computing devices may include or be linked to a wireless gateway, the wireless gateway being linked to the Internet so as to enable one or more wirelessly networked devices to access the Internet. One or more of the second set of computing devices could similarly be provided as wirelessly networked devices linked to the Internet by a wireless gateway. The third set of computing devices may include for example wireless smartphones, wireless computers or computers linked wirelessly to the Internet by a wireless computer network or cellular network, for example. The wireless networked devices described may include a browser for obtaining, receiving or being the source of consumer interaction information and for displaying or otherwise providing output to the consumer. The wirelessly networked devices could also be equipped with additional functionality for providing consumer interaction information, including for example a GPS receiver operable to provide GPS location information as part of the consumer interaction information and/or one or more accelerometers or other movement sensors operable to provide movement-based or gesture-based information. Thus the messaging to be returned to the consumer may include location, movement and/or gesture relevant content.

The invention claimed is:

1. A computer network implementable method for synthesizing relevant messaging from one or more domains of information, underpinned by non-promoted content, using a consumer-generated context, the method comprising:
    obtaining non-promoted content and linking the non-promoted content to at least one promoter;
    receiving advertising material from the at least one promoter;
    receiving a consumer-generated context; and
    semantically analyzing and synthesizing, or facilitating the semantic analysis and synthesis of, by one or more computer processors, relevant messaging based on the non-promoted content and the consumer-generated context, wherein the relevant messaging is traceable to the at least one promoter, the synthesizing comprising:
        deconstructing the advertising material received from the at least one promoter into a plurality of messaging leads; and
        selecting at least some of the plurality of messaging leads and assembling the selected messaging leads into a message based on the consumer-generated context, the message having relevant non-promoted content interspersed between the selected messaging leads from the received advertising material.

2. The method of claim 1, further comprising outputting the relevant messaging to the consumer.

3. The method of claim 1, wherein the non-promoted content is selected from the one or more domains based on the consumer-generated context.

4. The method of claim 3, wherein the consumer-generated context includes consumer browsing information and the consumer browsing information is analysed to determine a major theme or themes of consumer browsing.

5. The method of claim 1, wherein the messaging is synthesized from a randomly selected subset of the selected domains.

6. The method of claim 1, wherein the relevant messaging includes a semantic representation of the non-promoted content based on the consumer-generated context.

7. The method of claim 1, wherein the relevant messaging matches the non-promoted content to a consumer based on the consumer-generated context.

8. The method of claim 1, wherein a domain administrator links the promoter to the non-promoted content that is the underpinning of the domain.

9. The method of claim 6, wherein the consumer-generated context comprises consumer interaction information, and wherein the method further comprises:
    a) receiving the consumer interaction information;
    b) comparing the consumer interaction information to the generated semantic representations for identifying one or more relevant semantic representations; and
    c) semantically synthesizing the one or more relevant semantic representations along with the consumer interaction information into consumer concept definitions, the consumer concept definitions including the representation of the non-promoted content.

10. The method of claim 2, wherein the output includes displaying the relevant messaging as part of one or more linked web pages, wherein the non-promoted content is in a hyperlinked format.

11. The method of claim 10, wherein the non-promoted content synthesized for possible display is prioritized, wherein a higher priority results in a higher probability of display and/or a higher number in an order sequence for display.

12. The method of claim 11, wherein the priority is based on a parameter selected from the group consisting of: relevancy, higher fees, location of an IP address, GPS coordinates, or a combination thereof.

13. The method of claim 10, wherein the non-promoted content synthesized for possible display is time-sliced to accommodate more than one promoter or message.

14. The method of claim 9, wherein the consumer interaction information comprises consumer input on an interface, consumer demographic information, consumer browsing information, machine generated data, GPS data, sensor data, or any combination thereof.

15. The method of claim 1, wherein the semantic analysis is provided by faceted analysis, entity extraction, natural language processing, or any combination thereof.

16. The method of claim 1, wherein the semantic synthesis is provided by faceted classification, semantic reasoners, multi-document summarization, formal concept analysis, a customized semantic synthesis protocol, or any combination thereof.

17. The method of claim 14, wherein the consumer input is a web based search query and wherein a web page with search results is output.

18. The method of claim 1, wherein the method further comprises monitoring performance of the non-promoted content within the relevant messaging and enabling the at least one promoter to evaluate and update the semantic analysis and/or semantic synthesis of the non-promoted content based on the performance.

19. The method of claim 1, wherein a fee is charged for semantic analysis and/or semantic synthesis of the non-promoted content.

20. A computer system for synthesizing relevant messaging from one or more domains of information, underpinned by non-promoted content, using a consumer-generated context over a computer network linked to a plurality of computing devices, the system comprising:
   a) a first set of computing devices, and a second set of computing devices for obtaining non-promoted content associated with the first set of computing devices, wherein the non-promoted content is linked to at least one promoter, and wherein the second set of computing devices is further configured to receive advertising material from the at least one promoter;
   b) a third set of computing devices for obtaining, receiving or generating the consumer-generated context and providing the consumer-generated context to the second set of computing devices; and
   c) a semantic analyzing means and a semantic synthesizing means linked to the second set of computing devices for synthesizing relevant messaging based on the non-promoted content and the consumer-generated context, wherein the relevant messaging is traceable to the at least one promoter, the synthesizing comprising:
      deconstructing the advertising material received from the at least one promoter into a plurality of messaging leads; and
      selecting at least some of the plurality of messaging leads and assembling the selected messaging leads into a message based on the consumer-generated context, the message having relevant non-promoted content interspersed between the selected messaging leads from the received advertising material.

21. The system of claim 20, wherein the non-promoted content is selected from the one or more domains based on the consumer-generated context.

22. The system of claim 21, wherein the consumer-generated context includes consumer browsing information and the consumer browsing information is analysed to determine a major theme or themes of consumer browsing.

23. The system of claim 20, wherein the messaging is synthesized from a randomly selected subset of the selected domains.

24. The system of claim 20, further wherein the relevant messaging is provided to the third set of computing devices and the third set of computing devices is linked to an output means for outputting the relevant messaging to the consumer.

25. The system of claim 20, wherein the third set of computing devices includes a wireless gateway linked to the computer network and one or more wireless devices wirelessly linkable to the wireless gateway.

26. The system of claim 20, wherein the relevant messaging includes a semantic representation of the non-promoted content based on the consumer-generated context.

27. The system of claim 20, wherein the relevant messaging matches the non-promoted content to a consumer based on the consumer-generated context.

28. The system of claim 20, wherein a domain administrator links the promoter to the non-promoted content that is the underpinning of the domain.

29. The system of claim 24, wherein the output means includes a display means as part of one or more linked web pages, and wherein the semantic representation of the non-promoted content is in a hyperlinked format.

30. The system of claim 20, wherein the consumer-generated context comprises consumer interaction information.

31. The system of claim 30, wherein the consumer interaction information comprises consumer input on an interface, consumer demographic information, consumer browsing information, machine generated data, GPS data, sensor data, or any combination thereof.

32. The system of claim 20, wherein the semantic analyzing means comprises a utility for providing faceted analysis, entity extraction, natural language processing, or any combination thereof.

33. The system of claim 20, wherein the semantic synthesizing means comprises a utility for providing faceted classification, multi-document summarization, formal concept analysis, a customized semantic synthesis protocol, or any combination thereof.

34. The system of claim 31, wherein the consumer input is a web based search query and wherein a web page with search results is output.

35. The system of claim 20, further comprising a means for monitoring performance of the non-promoted content within the relevant messaging, and wherein the at least one promoter can update the semantic analysis and/or semantic synthesis of the non-promoted content in the relevant messaging.

* * * * *